June 6, 1961

W. C. SLEEMAN 2,987,014

FREIGHT VEHICLE LINING

Filed June 20, 1955

Inventor
William C. Sleeman
By Wayne Morris Russell
Atty.

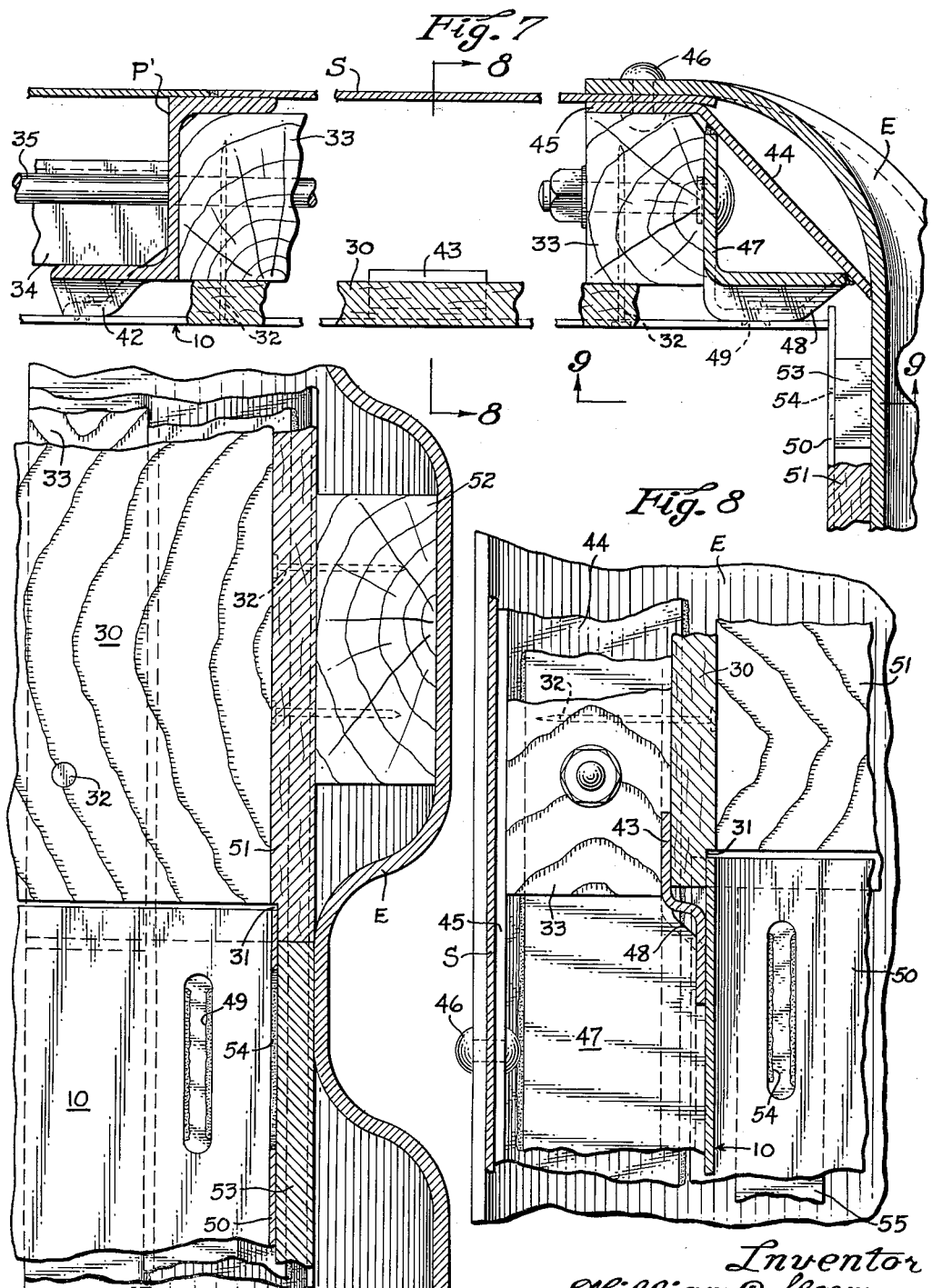

June 6, 1961 W. C. SLEEMAN 2,987,014
FREIGHT VEHICLE LINING
Filed June 20, 1955 4 Sheets-Sheet 4
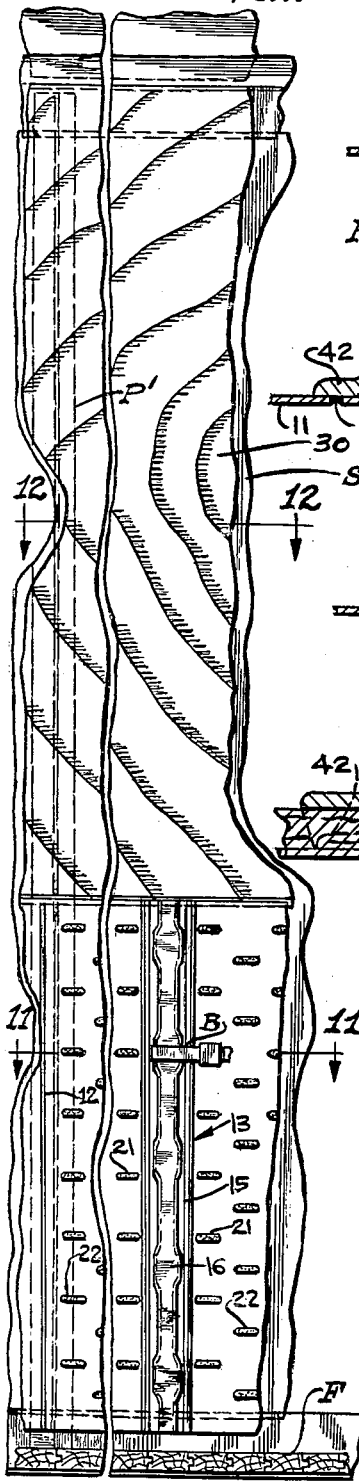
Fig. 10
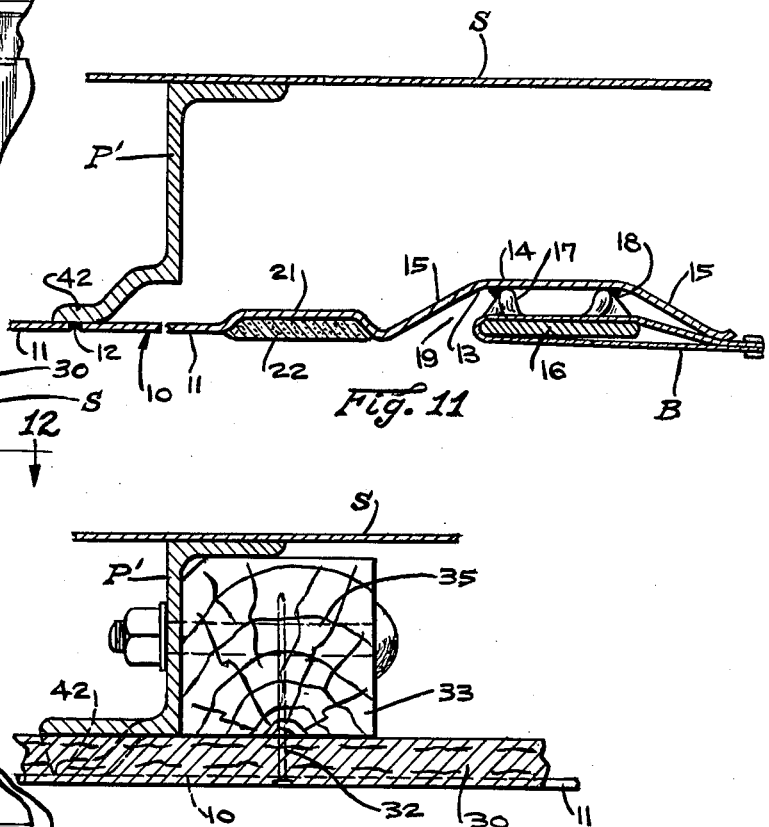
Fig. 11
Fig. 12
Inventor
William C. Sleeman
By Wayne Morris Russell
atty.

United States Patent Office 2,987,014
Patented June 6, 1961

2,987,014
FREIGHT VEHICLE LINING
William C. Sleeman, Birmingham, Ala., assignor to Pullman Incorporated, a corporation of Delaware
Filed June 20, 1955, Ser. No. 516,464
1 Claim. (Cl. 105—369)

The present invention relates to a lading-securing lining construction for the walls of freight vehicles, and more particularly to a lining construction providing means for securing and restraining the lading against shifting.

The invention contemplates the provision in a railway box car or other freight vehicle of a lining of metal, such as steel, secured to inner portions or surfaces of posts or like wall framing members on the outer portions of which may be secured outer wall sheathing. A vertical groove, indentation or corrugation, facing inwardly, is formed in the metallic lining, accommodating without projection inwardly of the lining, lading band anchor means extending continuously therein and defining therewith a series of vertically spaced openings through which lading bands may be passed for securement to the anchor means, to hold lading in place in a well-known manner, the corrugation affording a surface by which the lading bands are readily guided through the openings. The corrugation strengthens and stiffens the lining against undue deflection or distortion by the stresses to which it is subjected in use. The lining is also formed with suitably distributed inwardly facing indentations which carry suitable anti-slip means, such as a gritty material, to restrain lading engaging the wall from sliding therealong. The invention further contemplates the use of the metallic lining for either substantially the full height or only a portion of the height of the wall. In the latter case, a wooden or other non-metallic lining portion may be employed for at least part of the remaining wall height, providing a flush inner surface with the metallic lining portion.

It is an object of the invention to provide for a freight vehicle wall a metallic lining construction which retains lading in place.

Another object is the provision of a metallic lining construction for a freight vehicle wall which incorporates lading-securing means therein.

Another object is the provision in a freight vehicle wall of lading-retaining means which include as part thereof a metallic lining for the wall.

A further object is the provision of a metallic lining construction for a freight vehicle wall which is formed to serve as a lading-securing means.

Another object is the provision of a metallic lining for a freight vehicle wall which by vertical grooving therein cooperates with lading band anchor means for securing lading in place.

Still another object is the provision of a metallic lining for a freight vehicle wall which by inwardly facing indentations therein cooperates with lading-securing means to hold lading in place.

It is also an object of the invention to provide for a freight vehicle wall a lining formed by vertically related metallic and non-metallic lining portions achieving the objects stated hereinabove.

Other and further objects, advantages, and features of the invention will be apparent to those skilled in the art from the following description, taken in conjunction with the accompanying drawings, in which:

FIG. 7 is a horizontal sectional view through a corner of the car showing interior lining as in FIGS. 5 and 6 applied to both side and end walls;

FIG. 8 is a vertical sectional view through the side wall, taken substantially as indicated by the line 8—8 in FIG. 7;

FIG. 9 is a vertical sectional view through the end wall, taken substantially as indicated by the line 9—9 in FIG. 7;

FIG. 10 is a fragmentary elevational view of the interior of a railway box car side similar to FIG. 1 showing the combined metallic and non-metallic lining construction;

FIG. 11 is an enlarged horizontal sectional view through the wall lining taken substantially as indicated by the line 11—11 in FIG. 10; and FIG. 12 is an enlarged horizontal sectional view through the wall lining taken substantially as indicated by the line 12—12 in FIG. 10.

Figure 1:
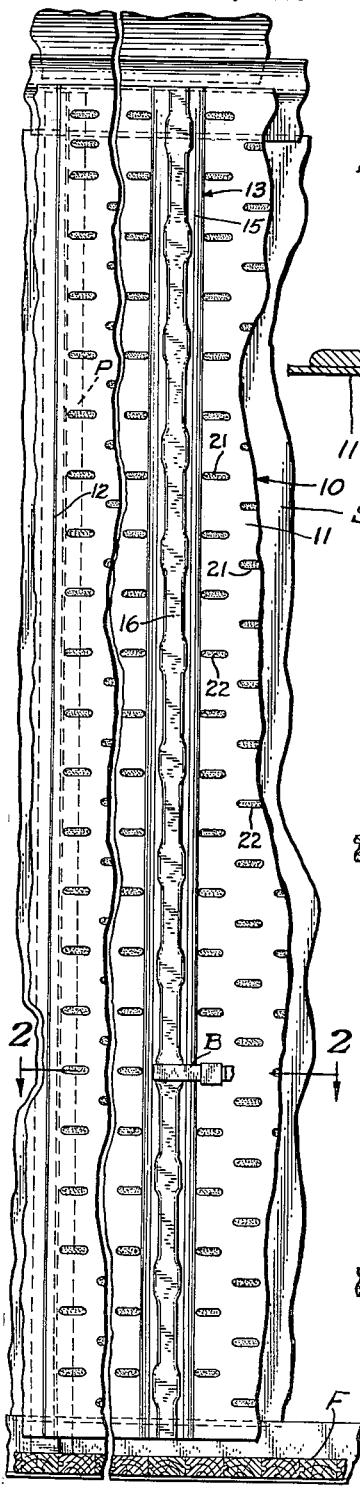
FIG. 1 is a fragmentary elevational view of the interior of a railway box car side wall embodying the invention.
Figure 2:
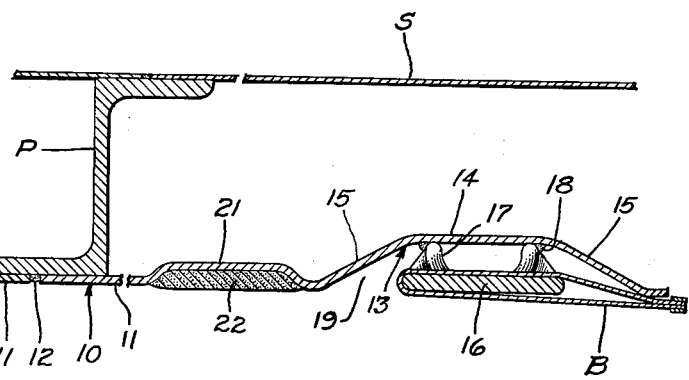
FIG. 2 is an enlarged horizontal sectional view through the wall lining taken substantially as indicated by the line 2—2 in FIG. 1.

Referring to the drawings, and particularly to FIGS. 1 and 2, there is shown a side wall of a box car, by way of illustration of one important application of the invention, in which vertical side posts P, only one of which is shown, extend between the car underframe and a known type of side plate adjacent the car roof. To the outer portions or surfaces of the posts is secured the outer wall sheathing S, which may be of any suitable material and form. From adjacent the car floor F to adjacent the upper ends of the side posts there extends an inner lining 10 of metal, preferably steel, formed in the illustrated case by vertically extending plates or sheets 11 engaging against the inner faces of the posts. Adjacent sheets preferably abut each other at a post P, so that they may have their adjacent vertical edges secured together and to the post by a single weld 12. At least one of the sheets 11 has a vertical groove or corrugation 13 formed therein, spaced from both vertical edges. More than one of the sheets may be formed with a corrugation 13, and more than one corrugation may be formed in a sheet, in accordance with the dimensions of the sheets and the number and spacing of the corrugations desired along the wall. As evident from the drawings, the corrugation is spaced between adjacent posts P. The corrugation 13 faces inwardly, having a substantially flat web 14 outwardly of the plane of the lining and side portions 15 extending between the web and the main or body portion of the sheet. The corrugation may have any depth less than the thickness of the wall, and any desired width, but preferably is so proportioned that the side portions 15 angle or curve relatively gradually between the sheet body portion and the corrugation web 14 without any sharp corners, and without giving undue width to the recess or corrugation.

Figure 6:
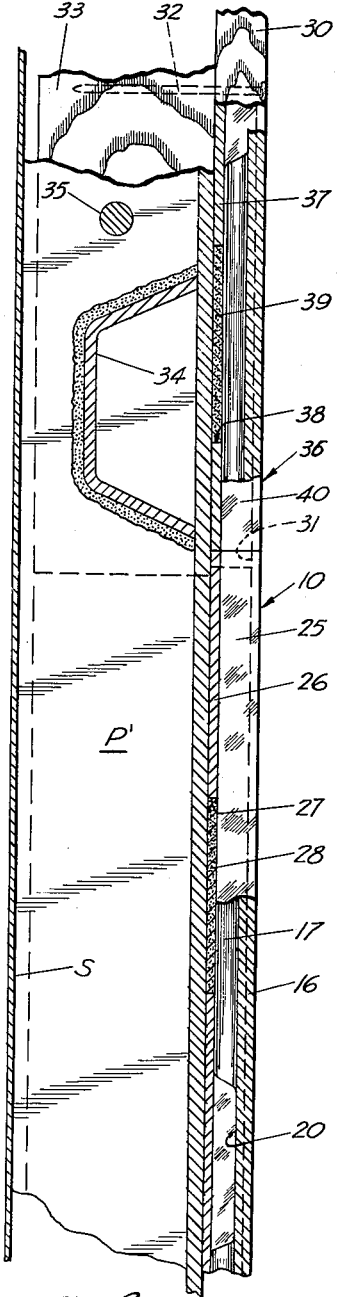
FIG. 6 is a vertical sectional view, with certain parts broken away, taken substantially as indicated by the line 6—6 in FIG. 5.

Lading band anchor means are secured and extend continuously in the corrugation. Such anchor means are shown in the present instance as a generally flat anchor bar 16 which is given a more or less channel section at intervals along its length by opposed marginal portions bent out of the plane of the bar to form legs 17, the edges of which are welded to the web of the corrugation as at 18 to secure the bar 16 in place, although other securing means may be employed if desired. The legs 17 are of such size as to give the anchor bar an overall depth equal to the depth of the corrugation 13, so that the inner surface of the bar is substantially flush with the inner face of the lining 10, while the width of the bar is somewhat less than the width of the corrugation at the body portion of the sheet, so that there is a space 19 between each corrugation side portion 15 and the adjacent edge of the bar. A series of vertically spaced openings 20 are defined between the bar and the corrugation, extending between the ends of successive pairs of bent marginal portions or legs 17, as best shown in FIG. 6. The sectional view of FIG. 2 is taken through one of these openings 20. A lading band B may be passed through any of the openings 20, one end being inserted in one of the spaces 19 and moved through the opening and out the other space 19, being guided in its movement by the surface of the corrugation, which as previously explained has a smooth contour or configuration and thus prevents snagging of the band. The lading band is suitably formed into a loop secured about the anchor bar 16, and, passing about a desired portion of the lading, has its other end secured to other anchor means at a suitable point in the car, as for example at the other side wall. The lading band B is shown as steel strapping commonly used for this purpose, but may be cable, rope, chain, or the like. The corrugation 13 imparts strength and rigidity to the lining 10 at the lading band anchor locations, so that it may withstand stresses imposed thereon by the lading through the lading bands. The anchor means may extend the full height of the lining, or for only a portion thereof, or in vertically spaced sections, but in any case at least one continuous series or plurality of vertically spaced openings for the lading bands is provided. This affords great flexibility in the number and vertical location of lading bands, so as to accommodate to a great variety of types of lading.

The lining 10 is also formed with a number of inwardly facing grooves or indentations 21, arranged or distributed in any desired pattern or spaced relation. Each of these indentations carries anti-slip means 22 for engagement with lading stowed along the wall, so as to prevent or at least minimize sliding of such lading under jolts or impacts to which the car is subjected. This tends to minimize movement of all the lading relative to the car and thus reduce stresses on the lading bands and anchor constructions. The anti-slip means is shown as a material which provides a gritty or other surface having a high coefficient of friction, at least filling the indentations and retained therein by adhesive or other suitable means.

Figure 3:
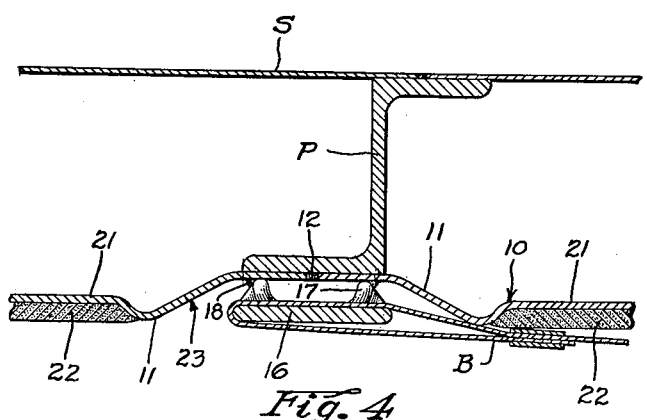
FIG. 3 is a view similar to FIG. 2, but showing another form which the invention may take.

In FIGURE 3, there is shown a lining construction similar to that illustrated in FIG. 2, differing in the provision of the vertical corrugation along the wall framing post. The lining 10 is formed by a plurality of metal sheets 11 of vertical adjacent edges which, as in the construction of FIG. 2, are disposed in substantially abutting relation to each other along and lapping a post P, and secured by a weld 12. The main or body portions of the sheets are spaced inwardly from the posts, the adjacent vertical marginal portions of adjacent sheets being offset outwardly to provide a corrugation 23 along the post P similar to the corrugation 13 of FIGS. 1 and 2, each marginal sheet portion forming substantially half of the corrugation 23. The corrugation 23 has secured therein vertically disposed, continuously extending lading band anchor means providing a plurality of vertically spaced lading band openings as in the case of the corrugation 13, for example the anchor bar 16 already described. Any of these openings may have a lading band B passed therethrough for looping about the anchor bar 16. The indentations 21 and anti-slip means 22 may be provided in the lining substantially as described in connection with FIGS. 1 and 2. In this construction, the corrugated formation in the lining and the framing post P to which the corrugation 23 is secured form together a very strong structure to take the stresses imposed by the lading through the lading bands.

Figure 4:
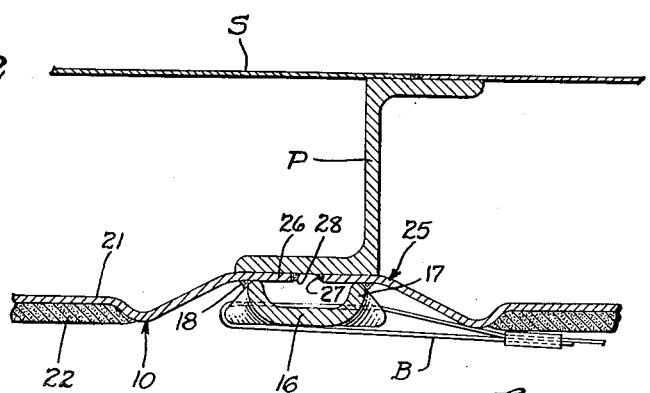
FIG. 4 is a view similar to FIGS. 2 and 3, but showing still another form in which the invention may be embodied.

Another lining construction is illustrated in FIG. 4, wherein an inwardly facing vertical corrugation 25 is formed in an intermediate portion of a lining sheet, similar to the corrugation 13, but located with its web 26 engaging against the inner surface of a post P in the manner of the corrugation 23, the lining 10 proper being spaced inwardly of the posts. The lining is secured to the post P by means of a number of vertically spaced slots 27 in the web 26, the edges of the slots being welded as at 28 to the post. Lading band anchor means, such as the anchor bar 16, secured in the corrugation 25 as by welds 18 or otherwise in vertical relation and extending continuously for at least a portion of the height thereof provide a plurality of vertically spaced openings 20 through which lading bands B may extend as described previously. To avoid interference with passage or threading of the bands through the openings, the slots 27 and welds 28 preferably are located between the openings 20, or in other words in the illustrated construction, behind the channel portions of the bar 16 which provide the legs 17 by which the bar is secured to the corrugation 25. This is made apparent in FIG. 4, which it will be noted is a horizontal section taken through a leg or channel portion of the bar. The indentations 21 and antislip means 22 may be employed in this lining construction as in those previously described.

While the metallic lining 10 preferably extends for substantially the full height of the wall, it may extend for only a portion of the wall height if desired. The sheets may have a greater horizontal than vertical dimension, and may extend the full length of the wall, as from the corner of a box car to the door opening. When a sheet extends beyond a post so that it does not present a vertical edge along the post for welding thereto, it may be secured to the post by slot welds. If the metal lining is employed for only a portion of the wall height, a wooden or other suitable non-metallic lining portion may be provided for the remainder or part of the remainder of the height of the wall.

Figure 5:
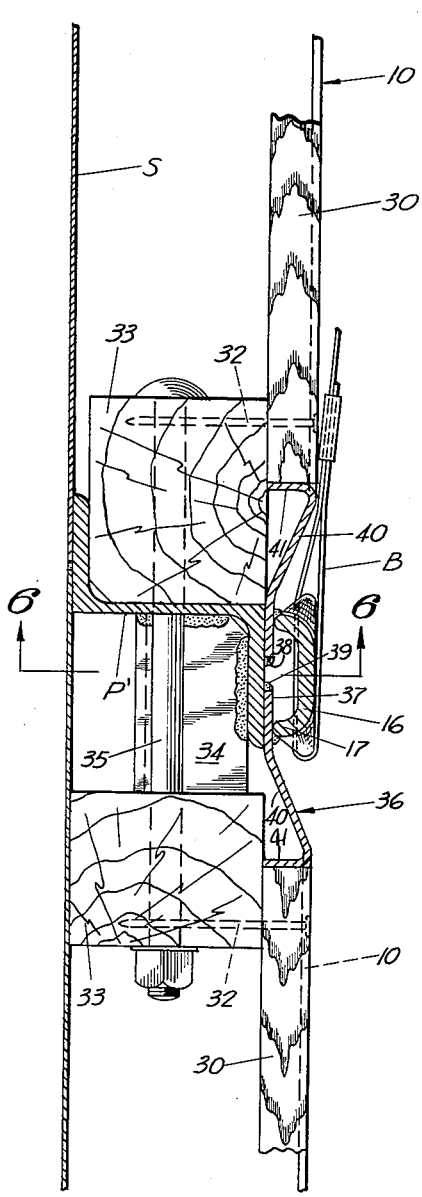
FIG. 5 is a view similar to FIG. 4, but illustrating the wall lining as formed of metallic and non-metallic portions while still embodying the invention.

One arrangement of an inner lining for a box car side wall comprising metallic and non-metallic lining portions is illustrated in FIGS. 5 and 6. In this construction, the metal lining 10 is substantially as in the construction shown in FIG. 4, but extends from adjacent the car floor only to a level substantially below the top of the wall. A corrugation 25 with its web 26 backing on a post P is formed in an intermediate portion of the lining sheet, substantially like the corrugation 25 in FIG. 4, and the lining secured to the post by the welds 28 along the edges of slots 27 in the corrugation web. From the upper edge of the metallic lining 10, for any desired vertical distance along the wall, extends a non-metallic lining 30, shown as wooden. The non-metallic lining normally is of appreciably greater thickness than the metallic lining, as will be obvious. The inner surfaces of the metal lining 10 and wooden lining 30 are substantially flush with each other, and the lower edge of the wooden lining is preferably rabbeted as at 31 (FIGS. 6 and 8) to receive the upper edge of the metal lining. The thickness of the wooden lining and the spacing of the inner face of the metal lining from the posts by the corrugation 25 correspond, so that the lining 30 engages against the side wall posts P. The wooden lining is secured as by nails, screws, or like means 32 to nailing strips 33 suitably anchored between the sheathing S and the lining, as by attachment to the posts P. Above each corrugation 25 in the metal lining portion, the wooden lining portion is cut away or otherwise suitably formed to provide a vertical slot or gap of a width corresponding to that of the corrugation, as evident from FIG. 5. The edges of the lining 30 defining this gap are secured to a pair of suitably spaced vertical nailing strips 33 mounted on the adjacent post P each extending along one edge of the gap. One of these strips engages directly against one side of the post, while the other is located a slight distance from the other side of the post.

Suitable spacers 34 extend between the post and the second nailing strip at intervals, and bolts 35 extend through both nailing strips and the posts to clamp the strips securely on the post. The strips extend from adjacent the upper edge of the lining 30 to adjacent its lower edge, and preferably slightly therebelow.

Secured in each gap in the wooden lining portion 30, in alignment with the corrugation 25, is a vertical guide plate 36 of steel or other suitable material, which has a cross section substantially corresponding to that of the corrugation, as clearly shown in FIG. 5, so that the inner surfaces of the corrugation and plate are substantially flush for practically their entire widths. The guide plate has a web 37, backing on the post P, with vertically spaced slots 38 along the edges of which are welds 39 securing the plate to the post. Side portions 40 of the plate extend from the web to the inner surface of the lining, and have outwardly bent edge flanges 41 the surfaces of which engage the adjacent edges of the wooden lining, the outer edges of the flanges abutting the respective nailing strips. The guide plate 36 preferably has its lower end abutting the upper end of the corrugation 25, as shown in FIG. 6, and forms a continuation or extension of the corrugation. The plate and corrugation may be united by a weld if desired. In the vertical groove, indentation, or channel defined by the plate and corrugation, lading band anchor means are secured which provide a series of vertically spaced lading band openings. Such means are illustrated in the form of the anchor bar 16 previously described, with the channel or leg portions 17 welded to the webs of the corrugation 25 and of the guide plate 36 and preferably located in overlying relation to the slot welds 28 and 39. Lading bands B may be passed through any of the openings 20 defined by the anchor means with the corrugation and guide plate. The anchor means may extend continuously over the joint between the corrugation and guide plate, and may of course extend throughout the height of the groove or channel formed thereby. A guide element for the anchor means may be provided in the wooden lining 30 otherwise than by the vertical gap and guide plate arrangement disclosed. It will readily be apparent that instead of the metal lining structure corresponding to that shown in FIG. 4, that of FIG. 3 may be employed in the construction of FIGS. 5 and 6, the only appreciable difference arising from the welding of adjacent edges of the lining sheets to the post instead of the welding of an intermediate portion of a sheet to the post by slot welds.

The combined metallic and non-metallic lining construction shown in FIGS. 5 and 6 lends itself well to incorporation of the metal lining structures of FIGS. 3 and 4, because the offset or corrugation in the metal lining portion may be of a depth corresponding to the difference in thickness of the metal and non-metallic lining portions so that both lining portions engage against the wall framing posts to give a strong construction while presenting a smooth, flush inner wall face, without any need for spacing or filling elements to compensate for the difference in thickness of the lining portions. In FIGS. 10, 11 and 12, there is shown a combined metallic and non-metallic lining construction which lends itself well to use of the metallic lining construction of Fig. 2 with a wooden or other non-metallic lining portion. In this structure, the metal lining portion 10 formed substantially as shown in FIG. 2 but extending upwardly for only a part of the wall height is supplemented by a wodden lining portion 30 substantially as shown in FIGS. 10 and 12, engaging flatly against upper portions of flanges of wall framing posts such as the post P', which is shown as of Z-section with one flange disposed outwardly for securement of the sheathing S and the other flange located inwardly for support of the side lining. Since the metal and non-metallic lining portions desirably have their inner surfaces flush and the non-metallic lining is thicker than the metal lining, the main or body portion of the metal lining is spaced inwardly of the wall posts. To compensate for the difference in thickness and permit the metal lining to be secured directly to the posts without employment of spacers or fillers, the inner portions of the posts are offset inwardly for substantially the height of the metal lining, as shown at 42 in the case of the inner flange of post P'. The metal lining 10 is welded or otherwise secured to the offset post portion, the corrugation or corrugations 13 being provided between posts as disclosed in connection with FIGS. 2 and 11. The non-metallic lining 30 is secured by suitable fastening means 32 to the nailing strips 33 mounted on the posts in any suitable manner, as by the bolts 35 as described. Z-shaped clips 43 may be welded at intervals to the rear or outer surface of the metal lining portion adjacent the upper edge to project upwardly behind the wooden lining 30, as shown in FIGS. 7 and 8, so that the adjacent edges of the metal and non-metallic linings are held against horizontal separation by the clips and the rabbet 31 in the lower margin of the wooden lining. The clips 43 may similarly be provided in the lining construction illustrated in FIGS. 5 and 6.

Other forms of side wall posts than those of Z-section as shown may be utilized, as for example posts of a configuration providing a vertical groove or channel, which latter type lends itself well to use as a door post with the lining construction of FIG. 2, the side lining overlying the post and a corrugation 13 being received in the channel, or with any of the linings as disclosed hereinabove, the lining whether all metal or of the composite type extending to the post and a replaceable nailer being secured in the channel to facilitate the attachment of grain doors across the door opening.

At the end of the car, the side lining is secured to a corner post provided at the juncture of the side wall with the car end E, which is formed with horizontal corrugations for impact resistance, as is common. The ends of the plate or plates forming the end E are curved to provide flanges lapping the sheathing at the sides of the car substantially as shown in FIG. 7. The corner post comprises a vertically disposed plate having a portion 44 extending diagonally between the end and side and a portion 45 extending flatwise along the inner surface of the sheathing S at the end thereof. Rivets 46 or other suitable means secure the end flanges, sheathing, and plate portion 45 together. The edge of the diagonal portion 44 is welded to the end E. The corner post is completed by an angle member 47 arranged with one flange paralleling the side lining and the other extending outwardly therefrom, the edges of the flanges engaging and being welded to the diagonal plate portion 44. The diagonal portion and angle member 47 thus form a hollow post. To the upper portion of the transversely extending flange of the angle member 47 may be bolted or otherwise secured one of the nailers 33 for the fastening of the end portion of the wooden lining 30 adjacent the corner. The lower portion of the other flange of the angle member is offset inwardly, as shown at 48 in FIGS. 7 and 8, similar to the offsetting of the flange of post P', to the outer face of the metal lining 10. The lining 10 is secured to this offset portion as by slot welds 49. The offset portion 48 is spaced inwardly from the end E, as shown, the offset being so formed as to diminish to the substantially straight edge of the diagonal portion 44 which is welded to the end E. This provides a space outwardly of the metallic side lining 10 for a purpose hereinafter made evident.

The end wall of the car provided by the end E is also provided with a lining, in this case a combined or composite metallic and non-metallic lining similar to side lining. The end lining comprises a lower metal lining portion 50 similar to the metal side lining portion 10, and an upper wooden or other non-metallic lining portion 51 similar to the side lining portion 30. The inner surfaces of the lining portions 50 and 51 are substantially flush, as in the case of the side lining. The non-metallic portion 51 is held against the inner surfaces of the outwardly facing horizontal corrugations of the end E by suitable fastening means 32 driven through the lining into nailing boards 52 secured in any usual manner in the inwardly facing corrugations, as best shown in FIG. 8. Metal filler strips 53 are welded to the inner surface of the corrugated end E, and the metal lining 50 is secured to the filler strips by slot-welds 54. The strips have a thickness corresponding to the difference in thickness between the lining portions 50 and 51 so as to provide for the flush disposition thereof, the upper edge portion of the metal lining 50 being received in the rabbet 31 in the lower edge portion of the wooden lining 51. Preferably, the joint between the metallic and non-metallic lining portions extends along one of the outwardly facing corrugations of the car end E, so that the lower edge of the lining portion 51 is received snugly between the corrugation and the upper edge of the metal lining portion 50 and thus held against horizontal separation from the metal lining without requiring clips 43 or other means for this purpose. It will be noted that the metal side lining portion 10 abuts the inner surface of the metal end lining 50, which projects outwardly beyond the metal side lining, the corner post construction providing space for such projection as previously explained. The non-metallic lining portions 30 and 51 may be disposed in similar relation. A close corner joint between the side and end lining is obtained.

What is claimed is:

A wall construction for a freight vehicle comprising horizontally spaced vertical wall framing members each having an upper portion of substantial length having an inwardly facing plane surface and the remainder of said member comprising a lower portion having an inwardly facing plane surface, said surface of the lower portion being offset inwardly from the plane of said surface of the upper portion, nailing strips secured to the upper portions of said framing members, said nailing strips having inwardly facing surfaces in flush co-planar relation with the inwardly facing surfaces of the upper portions of said framing members, a relatively thick non-metallic lining secured to said nailing strips, a relatively thin metallic lining secured directly to and in engagement with said inwardly facing surfaces of the lower portions of the framing members, said lower portion surfaces being inwardly offset sufficiently to align the inner surfaces of said metallic and non-metallic linings in substantially flush co-planar relation and the adjacent horizontal edges of the two linings substantially abutting each other.

References Cited in the file of this patent

UNITED STATES PATENTS

| | | |
|---|---|---|
| 1,558,323 | Whyte | Oct. 20, 1925 |
| 2,185,168 | Jumper et al. | Dec. 26, 1939 |
| 2,226,667 | Love | Dec. 31, 1940 |
| 2,316,696 | Johnston | Apr. 13, 1943 |
| 2,520,554 | Logmann et al. | Aug. 29, 1950 |
| 2,532,743 | Storch | Dec. 5, 1950 |
| 2,561,098 | Cole | July 17, 1951 |
| 2,570,368 | Moon | Oct. 9, 1951 |
| 2,601,103 | Dietrichson | June 17, 1952 |
| 2,610,587 | Pietzsch | Sept. 16, 1952 |
| 2,638,854 | Candlin | May 19, 1953 |
| 2,670,060 | Fenske | Feb. 23, 1954 |
| 2,709,973 | Meyer | June 7, 1955 |
| 2,759,432 | Adler | Aug. 21, 1956 |
| 2,763,219 | Adler | Sept. 18, 1956 |